United States Patent
Ackroyd

[15] 3,638,554
[45] Feb. 1, 1972

[54] PRODUCTION OF COOKED MEATS
[72] Inventor: Harry Briggs Ackroyd, Bletchley, England
[73] Assignee: Scot Meat Products Limited, Bletchley, England
[22] Filed: Feb. 13, 1970
[21] Appl. No.: 11,267

[30] Foreign Application Priority Data

Feb. 13, 1969 Great Britain .......................7,880/69

[52] U.S. Cl. ................................................99/107, 99/187
[51] Int. Cl. .........................................A22c 18/00, A23b 1/00
[58] Field of Search ..............99/107, 187, 351; 100/90, 232, 100/DIG. 10, 219, 249

[56] References Cited

UNITED STATES PATENTS

| | | |
|---|---|---|
| 3,011,895 | 12/1961 | Toepper et al............................99/107 |
| 3,039,382 | 6/1962 | Simon et al. ............................100/219 |

FOREIGN PATENTS OR APPLICATIONS

| | | | |
|---|---|---|---|
| 1,271,402 | 7/1961 | France....................................100/249 |
| 6,610,266 | 1/1968 | Netherlands | |

*Primary Examiner*—Hyman Lord
*Attorney*—Baldwin, Wight, Diller & Brown

[57] ABSTRACT

Cooked meat in units having uniform cross section and quality is prepared by arranging meat in a trough, evacuating the trough and compressing the meat therein into a unit of the desired cross section, sliding the unit of meat bodily into a container of the desired cross section while maintaining vacuum and compression, and cooling and cooling the meat while maintaining compression thereon. A container is used comprising a tubular body containing two slidable plugs between which the meat is confined, and a spring maintaining pressure on the meat, and a meat press to fill the containers comprising an evacuable trough in which the meat is arranged, and oppositely acting rams of unequal force operative to compress the meat in the trough and slide it bodily from the trough into the container.

7 Claims, 6 Drawing Figures

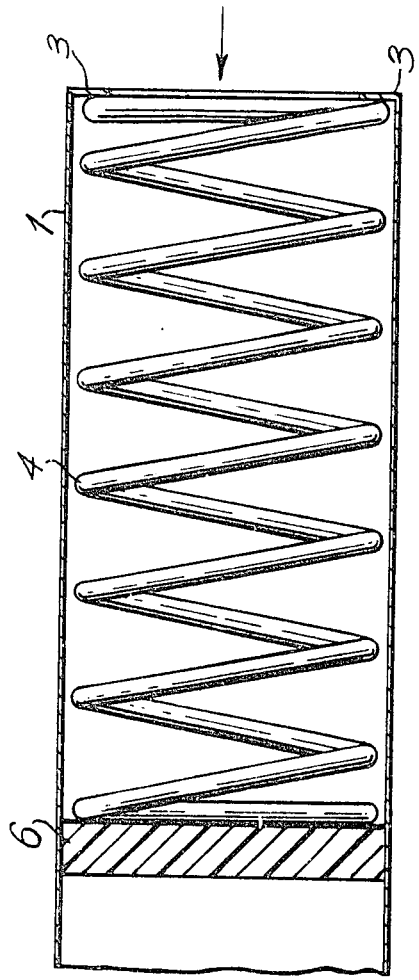
Fig.1.
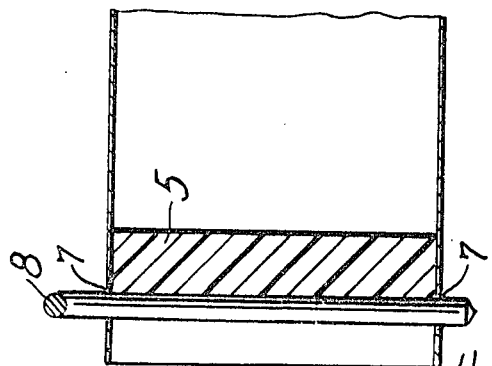

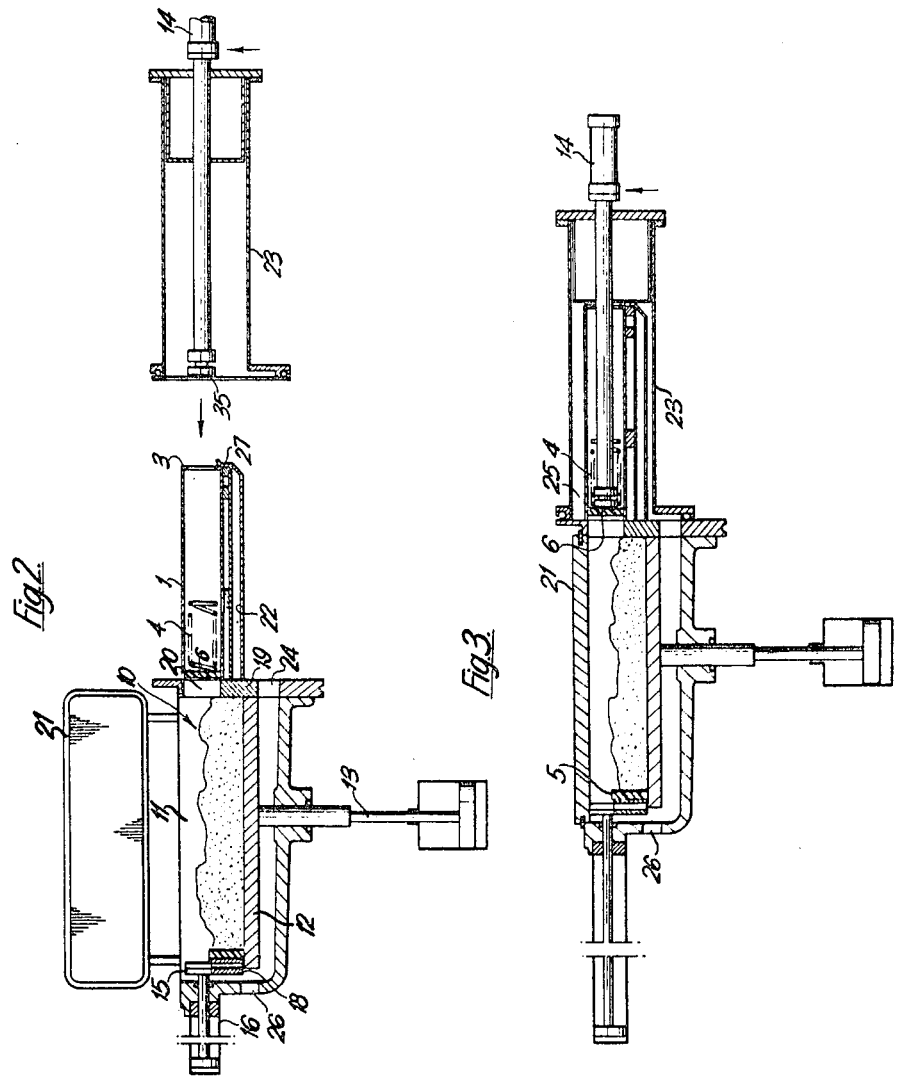

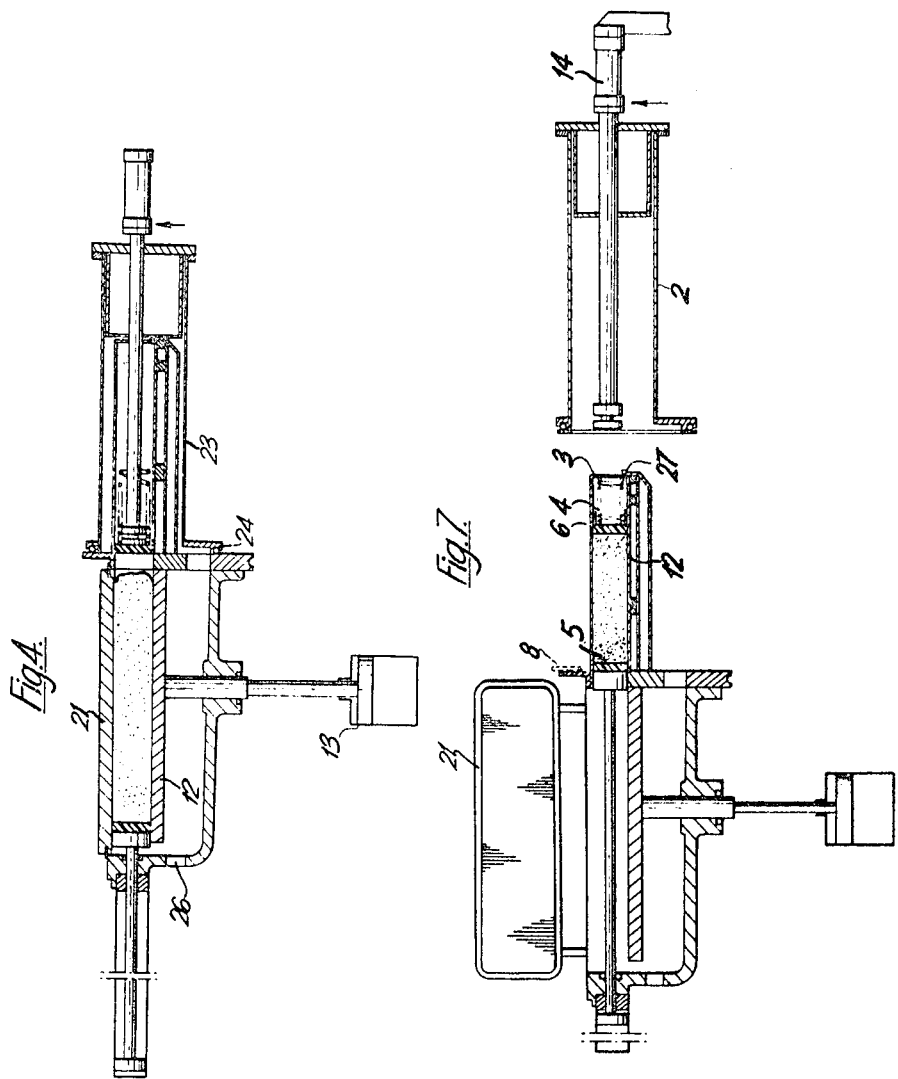

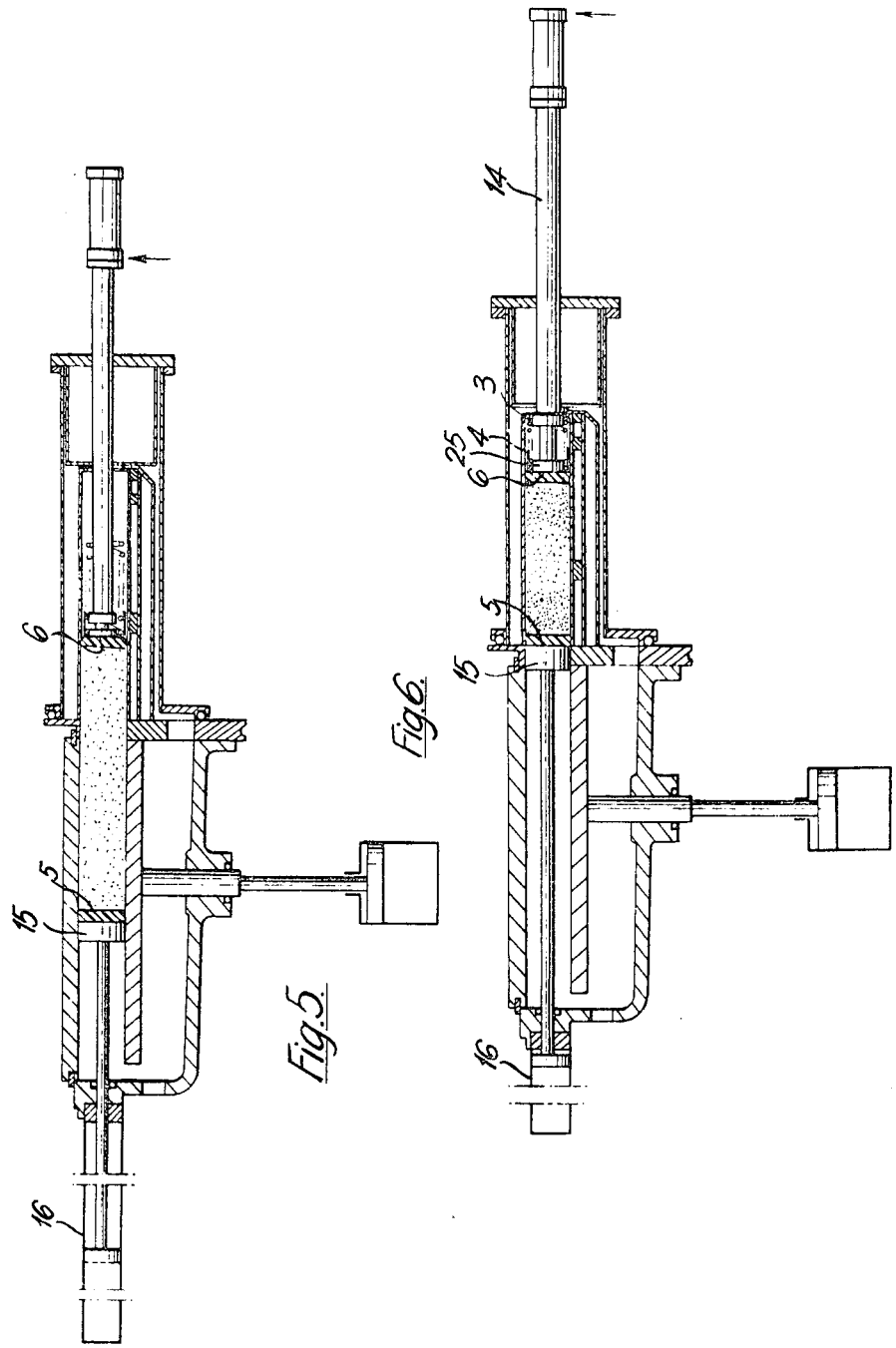

PRODUCTION OF COOKED MEATS

This invention relates to the preparation of cooked meats, for example ham and related beef and pork products, both cured and fresh.

There is a demand in the meat products industry for cooked meats which can be sliced to provide accurately controlled portions having uniform size, weight and quality.

This requires in effect that the cooked meat concerned be provided in units of uniform cross section in which the distribution of fat and lean and the direction of the grain of the meat is reasonably uniform throughout the length of the unit, so that successive slices of predetermined thickness will have the same bulk density and quality.

Hitherto, units of uniform cross section have been provided by pressing the meat concerned into containers or cans prior to cooking or pasteurization, the coagulation of the constituents of the meat during cooking producing a unit of the desired cross section. However, this known method has two disadvantages. Firstly, the action of pressing the meat into the containers tends to cause movement between the various parts or pieces of the meat during loading, with the result that there is a lack of control over the final distribution of the meat therein and the quality of successive slices in respect of bulk density and the proportion of fat to lean or grain direction may vary greatly. Secondly, there is a shrinkage of the meat during cooking with the result that the resulting units of cooked meat may contain voids filled only with juices which will also upset the uniformity of the slices that can be produced.

The object of the invention is to provide a method and apparatus to overcome this problem.

In its broadest aspect, the invention consists in a method of preparing units of cooked meat providing slices of uniform cross section and substantially uniform quality comprising the steps of arranging the meat in a trough in such a manner that the distribution of fat and lean and the grain direction of the meat is substantially uniform, evacuating air from the trough while reducing the cross-sectional and longitudinal dimensions of the trough so as to compress the meat into a unit of the desired cross section, bodily sliding the unit so formed while still under compression and vacuum into a tubular container having the desired internal cross section, and cooking and cooling the meat in said container while maintaining longitudinal compression thereon.

More particularly the invention relates to a method of preparing units of cooked meat providing slices of uniform cross section and substantially uniform quality comprising aligning a tubular container within which the meat is to be cooked in end to end relationship with a trough of larger cross-sectional dimensions, arranging in said aligned trough and container, a compression spring, a first laterally extending longitudinally slidable plate or plug, the meat to be cooked, and a second laterally extending longitudinally slidable plate or plug, the components being arranged in order from either end of the trough-container combination but so that the meat lies within the trough, covering the trough and container with airtight covers, evacuating air from the trough and container while moving in the sidewalls or base of the trough to reduce the cross section of the latter substantially to that of the container and compressing the components within the trough between rams acting from the free end of the trough and the free end of the container respectively, displacing both said rams relative to the trough and container so as to transfer the meat and the plates or plugs, together with the spring, from the trough to the container, and so as to compress the spring, closing the end of the container adjacent the trough to secure its contents, removing the container and transferring it to a suitable cooker, and after cooking and cooling, discharging the contents of the container. In one embodiment of the invention, the spring and the first plate or plug are preassembled in the container before it is aligned with the trough, and the second plate or plug is placed against the heat of the ram acting from the free end of the trough: the second plate or plug is secured within the container by locking means before removal of the container so as to secure the contents of the latter.

In an alternative embodiment, the second plate or plug is preassembled in the container, and the spring and the first plate or plug is placed at the outer end of the trough; after this latter assembly has been projected into the container, it is secured there by the application of locking means. In either case the locking means may be a staple or cross pins.

Preferably, the outer end of the container is provided with a flange to retain an adjacent plate or plug or the end of the spring: otherwise some alternative retaining means must be provided to prevent any parts from escaping from the free end of the container.

The invention also extends to apparatus for carrying out the above method comprising a trough with an openable airtight cover, means for supporting and securing a tubular container of comparable cross section to the trough in end to end alignment therewith and a withdrawable airtight cover for said support means and any container supported thereby, means to evacuate air from the trough and the withdrawable cover, and a first ram having a line of action extending through the trough from the outer end thereof, characterized by the provision of a second ram having a line of action extending along the axis on which a container is supported, said second ram being adapted to apply a smaller force than said first ram.

The invention also extends to a container assembly when used for cooling meat according to the method of the invention comprising in combination a tubular container open at both ends, said container having two plates or plugs extending laterally of said container and slidable therein, a compression spring to one side of the plates or plugs and adapted to be a sliding fit within the container, and means at each end of the container to retain said spring and the plates or plugs therein, the retaining means at at least one of the container ends being removable.

The invention is described further with reference to the accompanying drawings wherein:

FIG. 1 shows in longitudinal cross section a meat mold in accordance with the invention, and FIGS. 2–7 show diagrammatic longitudinal cross sections of apparatus in accordance with the invention at different stages of its operative cycle.

Referring to FIG. 1, the mold comprises a tubular stainless steel body 1 of square or round-topped cross section (although it will be understood that alternative cross sections could be employed), the tube being open ended but provided at one end with inwardly extending flanges 3. These flanges 3 retain inside the tube a spring 4 inserted from the first end of the tube, the spring being a steel coil spring 4 adapted when compressed to exert a pressure of between 4 and 20 lbs./sq. in. of the cross section of the body and being nickel plated to resist corrosion. The spring is a sliding fit within the body 1. Adjacent the other end of the body are apertures 7 in the wall of the tube adapted to receive a removable staple 8, adapted to retain plugs 5, 6 within the tube. The plugs 5, 6 are molded from polypropylene selected so as to be free from toxic plasticizers or pigments, to have adequate strength at cooking temperatures not to distort under the pressure applied by the spring 4 when compressed, and not to become excessively brittle under refrigeration. The plugs should be dimensioned so as to be a sliding fit within the tube at normal ambient temperatures but to engage the tube tightly at cooking temperatures as a result of thermal expansion. This tight engagement prevents excessive extrusion of juices from the meat during cooking. The body may be provided before use with a removable linear of synthetic plastic film.

Referring now to FIGS. 2–7, a channel shaped loading chamber 10 is formed by the sidewalls of a housing 11 and a base platform 12 carried by a pneumatic ram 13. One end of the forming chamber is closed by the head 15 of a further pneumatic ram 16, which head includes a sliding portion 18 so as to accommodate itself to the position of the platform 12.

At the other end of the chamber 10 is an end plate 19 having an aperture 20 corresponding in size to the cross section of the loading chamber 10 when the platform 12 is raised by the ram 13 and the chamber is closed by an airtight lid 21. From the end plate extends a platform 22 adapted to support a mold assembly as described with reference to FIG. 1 in alignment with the forming chamber with its unflanged end in contact with the end plate 19. The mold assembly is held on the platform by a clamp 27 engaging the outer (inwardly flanged) end of the mold body 1. The mold assembly is placed on the platform with the clamp released, and the clamp is then engaged to lock the assembly in place. The clamp is spring loaded to allow for slight variations in the length of the mold assemblies. A retractable airtight cover chamber 23 may be moved into place so as to surround the platform 22 and the clamped mold assembly and so as to enter airtight engagement with the end plate 18, an aperture 24 allowing air to pass between the chamber 23 and the housing 11. The chamber 23 supports a further pneumatic ram 14 having a head 25, this ram being in alignment with the ram 16.

In operation, and referring first to FIG. 2, a mold assembly is clamped on the platform 22, and meat is placed in the loading chamber 10, the meat being arranged so as to obtain the desired grain direction and distribution of fat and lean along the length of the chamber. The mold assembly comprises a mold body 1 inside which are placed a plug 6 and a spring 4. A plug 5 is placed at the opposite end of the trough, and the meat is placed between the two plugs. Referring to FIG. 3, the cover chamber 23 is then moved into place, and pressure applied to ram assembly 14 so that the head 25 of the ram passes through the spring 4 and engages the plug 6 so as to push the latter up to the inner end of the body 1: meanwhile the lid 21 is closed and a vacuum drawn in the housing 11 and the chamber 23 through an aperture 26 in the wall of the housing 11 while the ram 13 is actuated to raise the platform 12. This results in the meat being formed in the loading chamber, which under these circumstances has a similar cross section to the body 1, into the desired configuration (see FIG. 4).

Referring now to FIG. 5, pressure is meanwhile applied to the ram 16 so that the force applied to this ram is somewhat greater than that applied by the ram 14, which is thus forced back down the body 1 of the mold assembly, the meat being retained between the cover 6 and the ram head 15 and being moved without disarrangement into the body of the mold assembly, until the situation shown in FIG. 6 is reached, with the plug 5 within the inner end of the mold body, and the spring 4 compressed between the plug 5 and the flanges 3.

Then, as shown in FIG. 7, the pressure on the ram 14 is released, and after breaking vacuum the cover chamber 23 is withdrawn; the staple 8 is inserted, into the apertures 7 so as to retain the plug 5, after which the clamp can be fully released and the mold assembly removed, whereupon the apparatus is ready to carry out another cycle. The head 15 of the ram 16 may be provided with grooves to assist the insertion of the staple 8.

In an alternative embodiment of the method of the invention, the same apparatus is used, but the mode of use is slightly different. Instead of the spring 4 being placed in the mold assembly before use, it is placed between the plug 5 and the ram head 15, and the ram head 25 acts directly on the plug 6. The remainder of the operating sequence is the same except that the spring is on the opposite side of the meat, and that on reaching the stage shown in FIG. 7, the staple 8 is inserted so as to retain the spring in the mold body 1. This embodiment has the disadvantage that the capacity of the trough is reduced by the presence of the spring therein during loading.

In each case, the meat placed in the trough is pressed into shape by pressure from several directions and on withdrawal of air from the trough is held between two end walls formed by plates, or a plate and a ram head while being transferred from the trough to the container; held like this, the arrangement of the meat cannot be disturbed during transfer. Moreover, once in the container, the meat is subjected to continued compression by the spring which moves the plate 6 during cooking to take up any shrinkage, and which can also accommodate variations in the amount of meat placed in the trough at any one loading.

What I claim is:

1. A method of preparing units of cooked meat providing slices of uniform cross section and substantially uniform quality comprising the steps of arranging the meat in a trough in such a manner that the distribution of fat and lean and the grain direction of the meat is substantially uniform, evacuating air from the trough and reducing the cross-sectional and longitudinal dimensions of the trough so as to compress the meat into a unit of the desired cross section, bodily sliding the unit so formed while continuously maintaining it under vacuum and under longitudinal compression from both ends into a tubular container having the desired internal cross section, and cooking and cooling the meat in said container while maintaining longitudinal compression thereon, the meat being maintained under longitudinal compression by applying opposing longitudinal pressures to opposite ends of the meat during the transferring of the meat from the trough into the container, and one of the longitudinal pressures being greater than the other with said one longitudinal pressure being utilized in the movement of the meat into the container.

2. A method according to claim 1 wherein the tubular container within which the meat is to be cooked is aligned in end to end relationship with the trough there is arranged in said aligned trough and container a compression spring, a first laterally slidable plug, the meat to be cooked, and a second laterally extending longitudinally slidable plug, with the meat lying within the trough, sealing and evacuating air from the trough and container, and compressing the components within the trough between rams acting from the free end of the trough and the free end of the container respectively, displacing both said rams relative to the trough and container so as to transfer the meat and the plugs from the trough to the container and so as to compress the spring, and closing the end of the container adjacent the trough to secure its contents.

3. A method according to claim 2 wherein the spring and the first plug are preassembled in the container before it is aligned with the trough, and the second plug is placed against the head of the ram acting from the free end of the trough: and the second plug is secured within the container by locking means before removal of the container so as to secure the contents of the latter.

4. A method according to claim 2 wherein the second plug is preassembled in the container, and the spring and the first plug is placed at the outer end of the trough; and after this latter assembly has been projected into the container, it is secured there by the application of locking means.

5. The method of claim 1 including the steps of providing plugs for the opposite ends of the container, and utilizing the plugs to apply the longitudinal pressures on the opposite ends of the meat.

6. The method of claim 5 wherein the plugs are moved into the container serially with the movement of the meat thereinto.

7. The method of claim 1 wherein one of the longitudinal pressures is at least in part a spring pressure which is utilized in maintaining the longitudinal compression on the meat in the container.

* * * * *